United States Patent [19]
Thomson

[11] Patent Number: 6,130,916
[45] Date of Patent: Oct. 10, 2000

[54] METHOD AND APPARATUS FOR IMPROVING A TRANSMISSION DATA RATE OF BASEBAND DATA IN A WIRELESS NETWORK

[75] Inventor: Larry Steve Thomson, Bountiful, Utah

[73] Assignee: 3Com Corporation, Santa Clara, Calif.

[21] Appl. No.: 08/889,970

[22] Filed: Jul. 10, 1997

[51] Int. Cl.⁷ .................................................. H04B 15/00
[52] U.S. Cl. .......................... 375/285; 375/296; 370/493
[58] Field of Search ...................................... 375/222, 298; 370/204, 433, 435, 493, 494, 495; 455/72, 553, 557

[56] References Cited

U.S. PATENT DOCUMENTS

| | | |
|---|---|---|
| 4,654,867 | 3/1987 | Labedz et al. . |
| 4,697,281 | 9/1987 | O'Sullivan . |
| 4,991,197 | 2/1991 | Morris . |
| 4,998,289 | 3/1991 | Rabe et al. . |
| 5,168,516 | 12/1992 | Ito . |
| 5,386,590 | 1/1995 | Dolan . |
| 5,396,519 | 3/1995 | Betts et al. ............................... 375/296 |
| 5,452,289 | 9/1995 | Sharma et al. . |
| 5,453,986 | 9/1995 | Davis et al. . |
| 5,471,470 | 11/1995 | Sharma et al. . |
| 5,479,480 | 12/1995 | Scott . |
| 5,483,576 | 1/1996 | Staples . |
| 5,500,859 | 3/1996 | Sharma et al. . |
| 5,507,033 | 4/1996 | Dolan ....................................... 455/422 |
| 5,590,403 | 12/1996 | Cameron et al. ....................... 455/503 |
| 5,648,989 | 7/1997 | Ko .......................................... 375/296 |
| 5,666,659 | 9/1997 | Kernahan et al. ......................... 455/43 |
| 5,684,834 | 11/1997 | Betts et al. .............................. 375/298 |

*Primary Examiner*—Don N. Vo
*Assistant Examiner*—Phuong Phu
*Attorney, Agent, or Firm*—Workman, Nydegger & Seeley

[57] ABSTRACT

In a wireless communication system, a method and apparatus improves a data transmission rate of baseband data via a wireless transceiver adapted for voice transmission. A modem receives baseband data for distribution to a wireless transceiver. The modem complementary pre-conditions frequency amplitudes that are subsequently augmented or pre-emphasized by the wireless transceiver. The modem then modulates the pre-conditioned baseband data for transmission by the wireless transceiver. Modulation may be performed using a single-carrier, multiple-carrier or a carrierless technique. The wireless transceiver pre-emphasizes the modulated pre-conditioned baseband data for presenting a consistent or flat amplitude spectrum to the RF transmitter.

13 Claims, 6 Drawing Sheets

METHOD AND APPARATUS FOR IMPROVING A TRANSMISSION DATA RATE OF BASEBAND DATA IN A WIRELESS NETWORK

BACKGROUND OF THE INVENTION

1. The Field of the Invention

The present invention relates to the field of data transmission in a wireless network. More particularly, the present invention relates to a method and system for improving data rate transmission via a wireless transceiver optimized for voice transmission.

2. Present State of the Art

Wireless communication systems have become increasingly more prevalent and contribute greatly to the dynamic nature of modern society. Generally, wireless technology enables individuals to maintain communication contacts with fixed site stations or other mobile users. Such heavy demands on wireless communication technology have advanced the present state of the art in wireless communication to systems having very high levels of reliability and, hence, customer satisfaction. Modern, wireless communication systems have catered primarily to voice users, such as wireless users interacting with other users or systems using verbal communication. To improve customer satisfaction, therefore, wireless communication systems have been adapted to favorably facilitate verbal or voice communication.

As a result of the sprawl of wireless communication systems, additional applications of wireless communication technology have been undertaken. For example, wireless communication systems may additionally be used for the transmission of data information to and from a user such as in the case of paging and other digital transmission technologies. In the past, digital transmissions via wireless transceivers have tended to adequately accommodate the generally small amounts of digital data by employing low transmission data rates which were adequate. Transmission of substantial amounts of digital data at low data rates may congest communication channels. Data transmissions in wireless communication systems are especially impacted in analog cellular networks. In such analog systems, modems connected to analog wireless transceivers reliably transmit at around 9600 bits per second. Although these rates may be sufficient for transferring moderate amounts of data, modern applications of wireless communication networks demand additional bandwidth for satisfactory user interaction. Such wireless transfer applications include file transfers from a portable computer having a modem via a wireless transceiver.

An additional and increasingly more popular use of wireless data transmission involves wireless access of the Internet. A personal portable computer having a modem coupled to a wireless transceiver may access vast amounts of digital data from remote or mobile locations. Because of the large amount of data transferred during such activities as Internet access, satisfactory bandwidths for modems have increased to levels such as 28.8 kilobits per second transfer rates and higher. To facilitate such transfer rates, modems have become increasingly more sophisticated. Modern modems may employ sophisticated modulation techniques to transfer a substantial number of bits using sophisticated encoding structures. To facilitate high data rate transmissions, modems and wireless transceivers must efficiently utilize available bandwidth.

Figure 1:
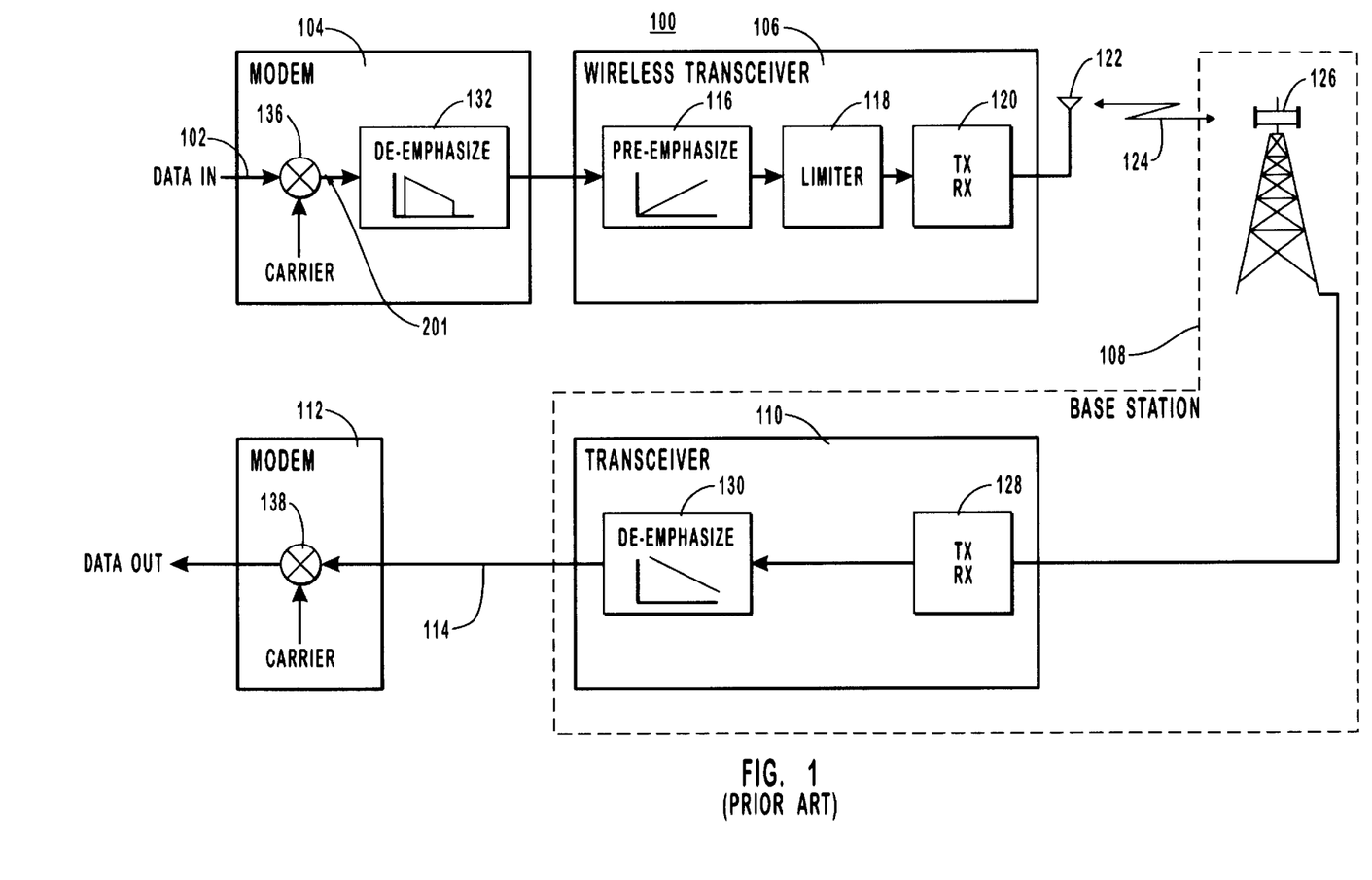
FIG. 1 is a block diagram of a prior art configuration of a wireless communication system capable of pre-processing data for transmission through a wireless transceiver adapted for voice information.

FIG. 1 represents a prior art configuration of a wireless transceiver 106 capable of wireless transmission to a wireless base station 108. Because wireless transceivers 106 typically facilitate voice transmission, a wireless modem 104 must be coupled to wireless transceiver 106 to facilitate modulation of input data 102 for transmission across an analog channel. Wireless base station 108 includes a transceiver 110 for modulating/demodulating the transmission carrier. Output signal 114 may then be routed through traditional network such as Public Switched Telephone Network (PSTN) or Integrated Services Digital Network (ISDN) networks to a recipient user for demonstration of output data 114 by a modem 112.

As discussed above, wireless transceiver 106, because of its substantial usage for voice transmission, has generally been optimized or adapted for transmission of voice information. A spectral analysis of voice information reveals that voice frequencies have higher amplitudes at the lower frequencies and taper-off as frequency increases. Wireless transceivers adapted for voice transmission have recognized this characteristic and have, therefore, incorporated a pre-emphasis module 116 to boost higher frequency amplitudes prior to transmission over a wireless network. Such a pre-emphasis processing of higher frequencies improves their tolerance for noise contamination resulting from the transmission process. Additionally, a limiter 118 clips any extraneously high amplitude levels of a voice-like signal. An RF transceiver 120 modulates the RF carrier frequencies with the voice signal for propagation via an antenna 122 across a wireless communication channel 124.

Wireless base station antennae 126 then captures the propagating transmission and delivers it to an RF transceiver 128 for demodulation of the transmit carrier. The carrier demodulated signal is then processed through a de-emphasizer module 130 for reducing the artificially increased amplitude levels of the higher frequencies of the transmitted voice information.

A spectral analysis of data information reveals that data maintains a constant or flat amplitude across the frequency spectrum. Early systems provided data having a flat spectrum directly to the input of wireless transceiver 106. Data was then pre-emphasized in pre-emphasis module 116, thus enhancing the amplitude levels of the higher frequencies. Such further enhancements to higher frequency amplitudes required that amplitudes exceeding a transmission threshold be clipped by limiter 118 to prevent out of bandwidth transmissions. Such clipping creates non-linear distortion which greatly facilitates the introduction of transmission errors. Alternatively, the amplitude of the data delivered to transceiver 106 could be reduced sufficient that the amplitude of the signal out of pre-emphasizer 116 would be low enough that it is not clipped by limiter 118. Such reduction of amplitude results in a lower signal-to-noise ratio, and hence a higher susceptibility to errors, which leads to lower data throughput. Therefore, pre-emphasis/de-emphasis processing which enhances and facilitates the transmission of voice information, degrades and renders susceptible to errors data transmission via the same transmission conduit of wireless transceiver 106.

Prior art configurations have attempted to remedy this situation by including within modem 104 a de-emphasis module 132 to pre-condition modulated input data prior to delivering such data to wireless transceiver 106. Input data 102 is first modulated by modulator 136 and presents modulated input data to de-emphasis module 132 for de-emphasizing or reducing the amplitudes of the higher frequency components of input data 201 following modulation. Such de-emphasized modulated data when presented to pre-emphasis module 116 becomes again emphasized in the higher frequencies thus giving the appearance of the original flat-spectrumed input data 201. Such prior art configurations of positioning a de-emphasis module 132 subsequent to modulator 136 have been implemented generally using a dedicated higher frequency filter required by the modulated characteristics of the signal undergoing such processing. Requiring a dedicated higher frequency capable hardware filter increases the complexity, size, weight, and costs of wireless modem 104 while potentially reducing the reliability due to the added components. When such de-emphasis processing of de-emphasis module 132 occurs in an existing component such as a digital signal processor, a significant number of instruction cycles are required to process the modulated baseband input data. When DSP instruction cycles are borrowed for collateral processing such as de-emphasis processing, overall throughput of modem 104 may be dramatically affected.

Thus, what is needed is a method and system for improving a data transmission rate of baseband data across a wireless network via a wireless transceiver that is adapted for voice transmissions.

SUMMARY AND OBJECTS OF THE INVENTION

It is, therefore, an object of the present invention to improve a data transmission rate of data information over a wireless transceiver generally optimized for voice information.

It is yet another object of the present invention to spectrally shape unmodulated baseband input data to complement internal signal conditioning resident within a wireless transceiver thus yielding a spectrally uniform transmit signal comprised of data information.

It is yet another object of the present invention to provide a method for improving a data transmission rate of baseband data within a wireless transceiver by spectrally shaping the baseband data.

It is a further object of the present invention to provide a wireless transceiver modem for improving a data transmission rate of baseband data via a wireless transceiver having a modulated data input adapted for voice information.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an apparatus and method for improving a transmission data rate of baseband data in a wireless network is presented.

The present invention incorporates pre-processing or spectral shaping of baseband data to complement the signal conditioning resident within a wireless transceiver. Signal conditioning resident within a wireless transceiver generally conditions voice information to improve transmit capabilities by emphasizing higher frequency components to create a more consistent or level amplitude of frequency components across the transmit spectrum. In the present invention, a computer sends and receives digital data across a channel in an un-modulated format. A modem receives the un-modulated baseband data, prepares it for dispatch to a wireless transceiver across a channel. To compensate for the signal conditioning resident within the wireless transceiver, the modem selectively alters (increases or decreases) amplitudes of various frequency components of the un-modulated baseband data. The modem then processes the de-emphasized baseband data by "modulating" the data. A variety of technologies for propagation of data to the wireless transceiver exist such as modulation of the baseband data with a modulation carrier, or direct "modulation" or transmission of carrierless digital data from the source (e.g., Pulse Code Modulation (PCM)).

In addition to carrierless "modulation" of data across the channels, data may be conveyed using multi-carrier modulation (MCM) technology wherein the bit stream may be partitioned or otherwise configured for transmission of data over a plurality of modulated carrier frequencies (e.g., Digital Subscriber Line (xDSL)). As used herein, "modulation" refers to carrier, non-carrier or carrier-less, or multi-carrier modulation techniques unless otherwise specifically distinguished.

Because of the primary role of wireless transceivers in transceiving voice information, wireless transceivers are generally optimized or at least adapted to transmitting voice information in an efficient manner. A spectral evaluation of voice information reveals that voice information exhibits larger amplitudes in lower-frequency components and smaller amplitudes in higher-frequency components. To directly transmit such amplitude-varying information would likely dictate the corruption of smaller amplitude signals by communication channel noise. Therefore, wireless transceivers augment or "pre-emphasize" lower amplitude information frequencies before transmission. A wireless transceiver performs a pre-emphasis spectral shaping process on modulated de-emphasized data. Such typical pre-emphasis processing selectively increases amplitudes of higher frequencies of modulated de-emphasized baseband data relative to lower frequencies.

In comparison, data information exhibits a more constant amplitude profile (i.e., wherein higher frequencies tend to have a consistent amplitude with those of lower frequencies for data information). When data information passes through the pre-emphasis module of the wireless transceiver, amplitudes of higher frequencies are augmented. When such augmented data information exceeds a threshold, a time domain limiter clips the signal thereby affecting the integrity of the data.

The present invention prevents or minimizes distortion of data information caused by a pre-emphasis module contained within a wireless transceiver adapted for voice transmission by employing a method and apparatus for pre-conditioning the data information prior to performing the modulation within the modem. The pre-conditioner module, transforms a data profile in such a manner that the frequency response of the signal delivered to the limiter in the wireless transceiver is essentially flat. By selectively increasing or decreasing the amplitudes of the various frequency components of the data signal, the effects of the pre-emphasizer can effectively be "undone." Presenting a flat signal to the limiter maximizes the power at which the modem can transmit without clipping the signal, thus rendering the signal less susceptible to the influence of noise introduced in the communications channel.

In the present invention, the pre-conditioning procedure of the pre-conditioner module is performed upon input baseband data prior to modulation with or without a carrier. By performing spectral shaping on baseband data, processing may be simplified. For example, if a digital signal processor is employed to perform other functions such as filtering or interpolation within the modem, an additional independent spectral shaping filter may not be required since de-emphasis or pre-conditioning of the input data may be performed prior to the modulation of such data using existing filters or other functions in the digital signal processor. Thus, in the preferred embodiment of the present invention, the processing of baseband data as opposed to modulated baseband data may be simplified and require fewer instruction cycles by a digital signal processor.

While the exemplary embodiment shows a de-emphasis module resident within a modem, an alternative embodiment incorporates the de-emphasis module into the wireless transceiver. Such a configuration allows both data and voice information to be directly transferred to the wireless transceiver for dispatch therefrom.

Naturally, other forms or configurations of improving a data transmission rate of baseband data by pre-conditioning or emphasizing baseband data are to be considered within the scope of the present invention.

These and other objects and features of the present invention will be more fully apparent from the following description and appended claims, or may be learned by the practice of the invention as set forth herein.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 2:
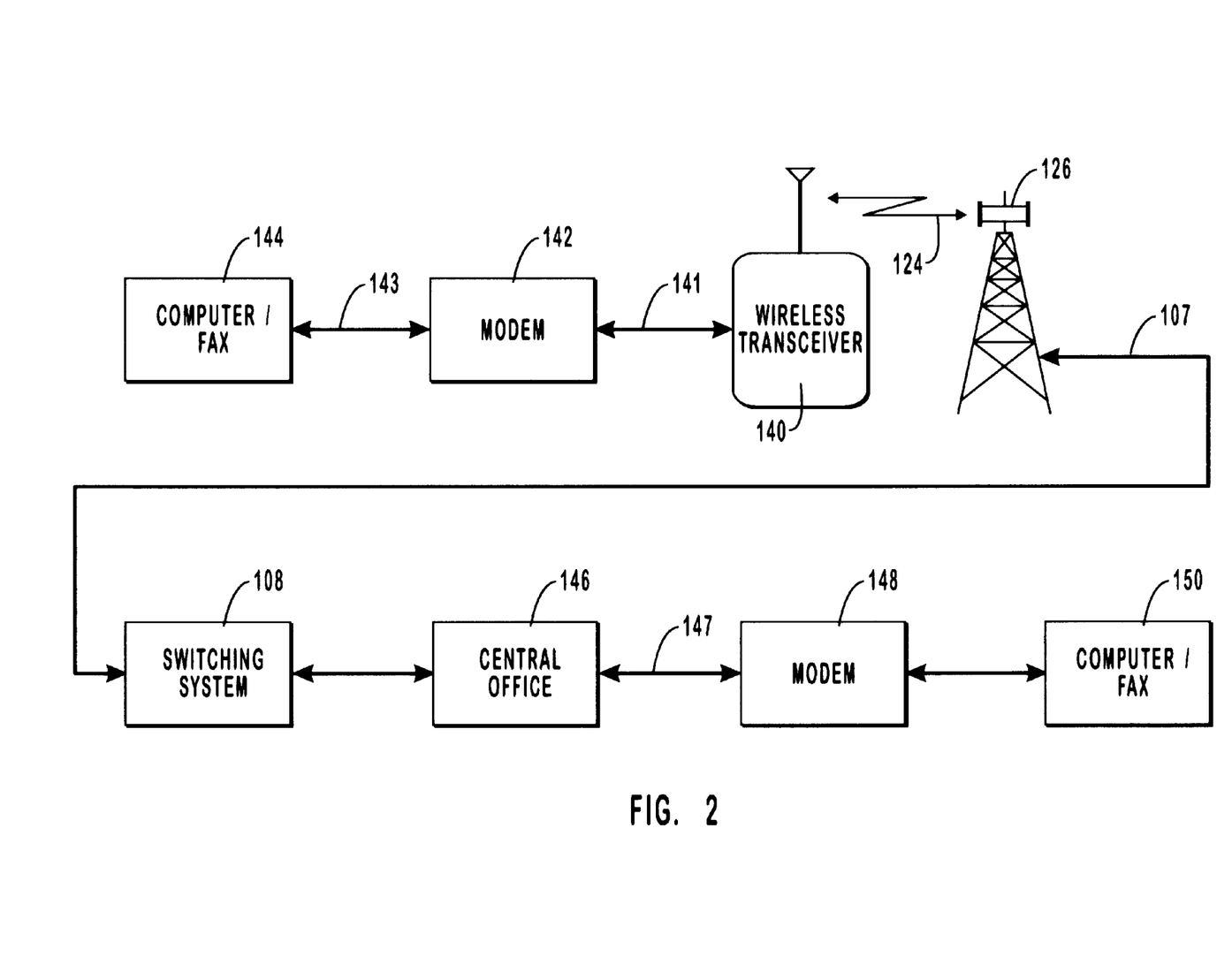
FIG. 2 is a high level block diagram of components of a wireless communication system adapted for wireless transmission of data, in accordance with the preferred embodiment of the present invention.

FIG. 2 is a block diagram of a wireless communication system as configured in a traditional cellular wireless configuration. It should be noted that nothing within the present invention requires that such wireless communication systems be configured as cellular systems, in fact, the present invention also finds application to other wireless configurations that have heretofore found their primary utility in the transmission of voice information.

In the present invention, a data generator or data source such as a computer 144 transmits or receives digital data from an independent data source or sink such as a computer 150 in FIG. 2. FIG. 2 depicts destination computer 150 as a wired device, however, nothing prevents computer 150 from assuming a wireless configuration as depicted by computer 144. A computer 144 sends and receives digital data across a channel 143 in an un-modulated format. A modem 142 receives the un-modulated baseband data, prepares it for dispatch to a wireless transceiver 140 across a channel 141. Upon receipt of un-modulated baseband data from computer 144, modem 142 selectively pre-conditions or alters amplitudes of various frequency components of un-modulated baseband data. Such filtering conditions the baseband data for "high-pass" filtering or pre-emphasis and other processing by wireless transceiver 140. Filtering by modem 142 and wireless transceiver 140 is described in detail in FIGS. 3–6.

Channel 141 may employ a variety of technologies for propagation of data to wireless transceiver 140. For example, traditional modems modulate/demodulate the data as received from computer 144 with a modulation carrier as required by earlier switching components of telephone networks.

However, modernly, the switching components of telephone networks facilitate direct transmission of digital data from the source. For example, 56 kilobit per second modems and other high speed coding devices employ the direct transmission of pulse code modulation (PCM) data directly into the telephone network from a modem or other coding device. Such "modulation" or coding techniques do not employ a separate carrier as the original use of the term implied. It should also be noted that some interfaces between modems and a central office 146 via a channel 147 may employ asymmetric transmission techniques. For example, a modem 148 transmitting data to central office 146 may employ modulation using a carrier while the transmission from central office 146 to modem 148 may employ a carrier-less technique such as PCM. Such asymmetry could result from the signal-to-noise ratio discrepancies in analog-to-digital conversion at central office 146.

Channel 141 between modem 142 and wireless transceiver 140 typically comprises a "4-wire bus" (traditionally comprised of 3 wires: one for each direction and a shared ground) facilitating the transmission of carrier-less PCM data in both directions over individual channels. Wireless transceiver 140 comprises a modulated data input adapted or optimized to accommodate voice-like information. Additionally, communication channel 124 comprises separate transmit and receive frequencies which continues to support asymmetric transmit and receive transmission of carrierless PCM data in the preferred embodiment.

In addition to carrier-less "modulation" of data across channels 141 and 147, data may be conveyed using multi-carrier modulation (MCM) technology wherein the bit stream may be partitioned or otherwise configured for transmission of data over a plurality of modulated carrier frequencies. Other techniques also contemplated within the scope of the present invention include transmission techniques such as Digital Subscriber Line (e.g., xDSL, Asymmetric DSL) which allows mixing different types of data as well as providing a plurality of channels using techniques such as MCM. As used herein, "modulation" refers to carrier, non-carrier or carrier-less, or multi-carrier modulation techniques unless otherwise specifically distinguished.

Wireless transceiver 140 performs a pre-emphasis spectral shaping process on modulated pre-conditioned data. Such typical pre-emphasis processing selectively increases amplitudes of higher frequencies of modulated pre-conditioned baseband data relative to lower frequencies. Wireless transceiver 140, prior to transmission of the modulated data, must modulate with an RF carrier the modulated data for successful propagation to a wireless base station 108 via an antenna 126 and a channel 107. When a wireless communications system assumes a cellular configuration, wireless base station 108 performs switching functions which route such data to central office 146 which is generally configured as the central office for the public switched telephone network. Wireless base station 108 additionally performs the RF carrier demodulation and transforms the propagated signal back to a demodulated format consisting of modulated data which may or may not be comprised of one or more carriers. The modulated digital data is then routed to a modem 148 which performs demodulation by stripping the carrier from the baseband if such a carrier was employed. A data sink or destination, such as computer 150, then ideally receives the data as dispatched from computer 144.

Figure 3:
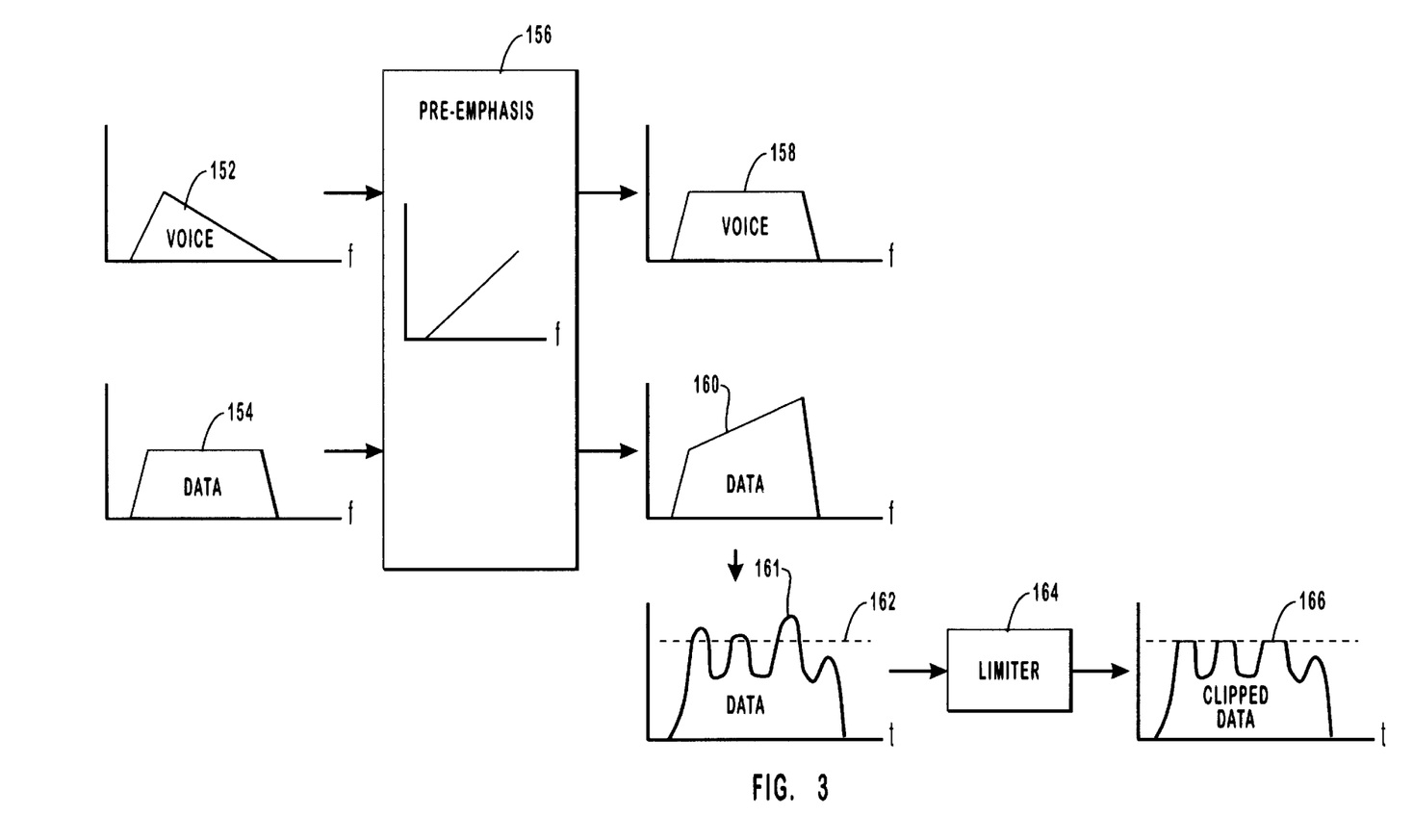
FIG. 3 is a spectral diagram of voice and data information subjected to pre-emphasis processing, in accordance with the present invention.

FIG. 3 is a diagram representing the spectral amplitude distributions for voice information and data information, in accordance with the present invention. As shown in FIG. 3 and as mentioned briefly above, voice information profile 152 illustrates a spectral profile exhibiting larger frequency amplitudes for lower frequencies and diminished frequency amplitudes for higher frequencies. If voice information profile 152 were directly modulated without undergoing any spectral modifications, noise contamination acquired through the communication channel would be closer in magnitude to the lower amplitude levels of the higher frequencies. Therefore, a pre-emphasis module 156, generally resident within wireless voice transceivers such as cell phones, boosts the amplitude levels of the higher frequencies as shown in pre-emphasized voice information profile 158. By boosting the higher frequencies, the voice information becomes more robust and less susceptible to interference from noise injected from transmission through a communication channel. That is to say, if the injected noise floor remains roughly constant for all frequencies, then the boosted amplitude levels of the higher frequencies enable the receiver to extract the higher frequencies out of the communication channel noise floor. Post-processing of pre-emphasized voice information profile 158 through a de-emphasis module may reduce the amplitudes of the higher frequencies back to the typical voice information profile similar to that shown in voice information profile 152.

On the other hand, data information exhibits a more consistent amplitude profile as depicted in data information profile 154. As shown, higher frequencies tend to have a consistent amplitude with those of lower frequencies for data information. When such data information passes through a pre-emphasis module 156, amplitudes of higher frequencies are further augmented as shown in the frequency domain as pre-emphasized data information profile 160 and in the time domain as pre-emphasized data information profile 161. When such augmented data information exceeds an amplitude threshold 162, a time domain limiter 164 clips the higher amplitudes thereby affecting the integrity of the data as shown in clipped data information profile 166. Such clipped data results in distortion of the original data information.

To prevent or minimize distortion of data information caused by a pre-emphasis module contained within a wireless transceiver adapted for voice transmission, a pre-conditioner module (FIG. 5) is employed in the present invention to pre-condition the data information prior to performing the modulation within the modem. In an alternate embodiment, a pre-conditioner module transforms a data profile to more nearly approximate that of a voice information. That is to say, by reducing the amplitude of the higher frequency components of the input data the input data profile more nearly approximates a voice profile which benefits greatly from the pre-emphasis processing resident within the wireless transceiver. By pre-conditioning the higher frequency components of the input data, the pre-emphasis feature returns the input data profile to a more consistent or level profile, wherein the frequency components are less susceptible to the influence of noise introduced through the communication channel.

It should be noted that although the discussion of the pre-emphasis function of the present invention has been simplified by describing the pre-emphasis processing as a process wherein a data signal is transformed or modified into a profile more characteristic of a voice signal, further improvements in the preferred embodiment are noted when the pre-condition processing performs the complementary processing necessary to counteract or complement the pre-emphasis processing resulting in conditioned input data displaying flat or consistent amplitude levels for propagation across a wireless communication channel. As used herein, pre-emphasis processing or transformation of input data includes both the spectral transformation of input data into a voice information profile and the spectral transformation of data in such a manner as to compliment pre-emphasis processing within a wireless transceiver. Such complementary pre-conditioner processes may be represented by complex filtering waveforms beyond simple ramping functions.

Figure 4:
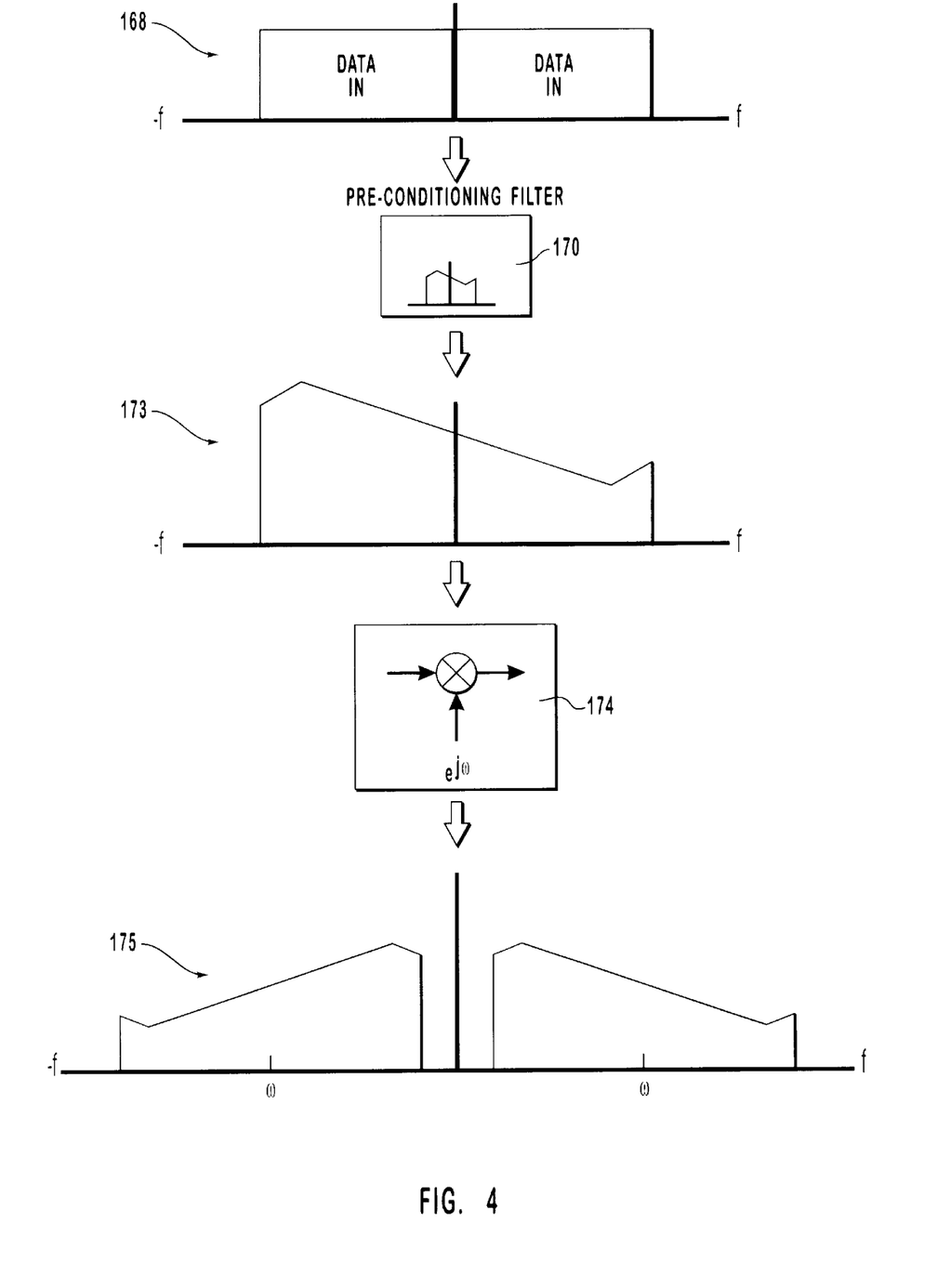
FIG. 4 is a spectral diagram of data information subjected to pre-conditioning processing, in accordance with an embodiment of the present invention.

FIG. 4 is a spectral diagram of the pre-conditioning processing in accordance with the preferred embodiment of the present invention. In FIG. 4, the input data is represented as complex input data 168 showing both positive and negative frequency components as is characteristic with frequency representations. Complex input frequencies 168 undergo a pre-conditioning process in pre-conditioner module 170 to spectrally shape the input data signals for subsequent processing by a pre-emphasis and other voice processing modules generally resident within a wireless transceiver. As discussed above, pre-conditioner module 170 may perform more sophisticated spectral shaping or signal conditioning than simple low-pass filtering of other prior art techniques. That is to say, complex frequencies having positive and negative frequency components may be individually manipulated or conditioned to perform the desired complimentary pre-conditioning processing of input data. Such complimentary processing is exhibited in pre-conditioning data profile 173, wherein positive frequency components generally exhibit a lower amplitude than their negative frequency counterparts. The objective of spectral shaping by pre-conditioning module 170 is to perform conditioning of input data 168 such that when data profile 173 undergoes subsequent processing, a consistent spectral profile results which is most favorable for propagation. Generally, such a resultant profile will consist of a flat spectral profile.

A complex modulator 174 modulates the pre-conditioned input data with a complex carrier frequency to form a modulated pre-conditioned profile 175.

Figure 5:
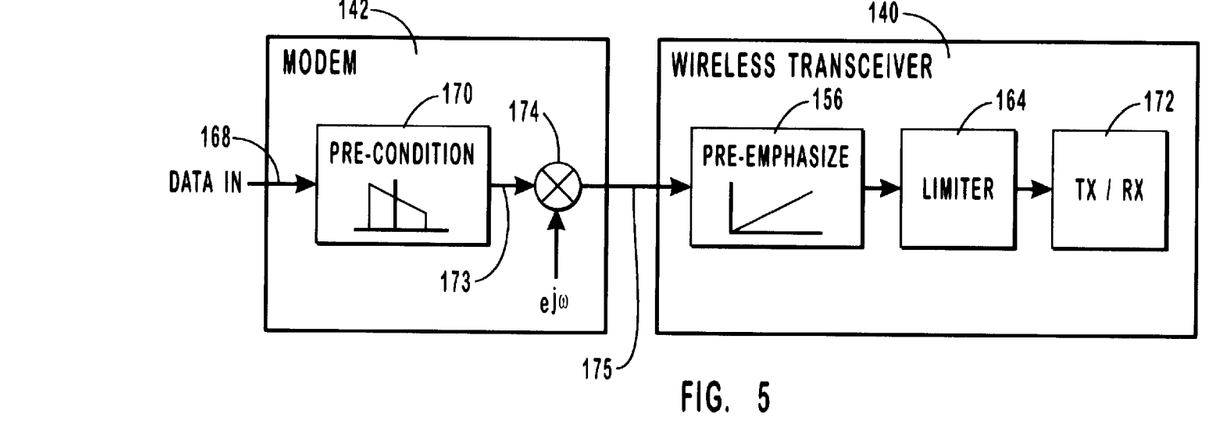
FIG. 5 is a block diagram of a modem capable of pre-conditioning input data for transmission via a wireless transceiver adapted for transmission of voice information, in accordance with the preferred embodiment of the present invention.

FIG. 5 is a block diagram representing conditioning of data information prior to modulation by the modem, in accordance with the preferred embodiment of the present invention. A modem 142 receives input data 168 having the spectral frequency profile similar to data information profile 154 (FIG. 3) wherein all frequency components exhibit a roughly uniform amplitude profile or, alternatively, scrambles such data to crate a spectrally flat signal. Input data 168 is subjected to pre-condition module 170 wherein amplitudes of various frequencies of input data 168 are altered in amplitude to approximate a complimentary waveform for maximizing the effect of a pre-emphasis module 156 on generating a more consistent amplitude signal for transmission.

In the present invention, the pre-conditioned procedure of pre-conditioner module 170 is performed upon baseband data, input data 168, prior to modulation with or without a carrier of such data. By performing spectral shaping on baseband data, processing may be simplified. For example, if a digital signal processor is employed to perform other functions within modem 142, the processing of baseband data as opposed to modulated baseband data may be simplified and require fewer instruction cycles by a digital signal processor since baseband data may be preconditioned using existing DSP functions. As a result, component size, space requirements, power consumption and weight of modem 142 may be reduced. Additionally, when a component count within modem 142 is reduced, reliability increases. Also, other prior art systems performing de-emphasis of modulated baseband data have required separate and distinct filtering circuits, thus increasing the components count and complexity of a modem.

Additionally, when a digital signal processor or other processing device is needlessly required to perform additional cycles or instructions, such as in the case when spectral shaping is performed on modulated baseband data, execution of such extraneous instruction cycles inhibits or delays other features such as data compression thereby impacting and degrading the performance of modem 142. Thus, in the preferred embodiment of the present invention, an additional independent spectral shaping filter is not required as pre-conditioning of the input data is performed prior to the modulation of such data. The modulated pre-conditioned baseband data when transferred to wireless transceiver 140 undergoes a pre-emphasis procedure performed by pre-emphasis module 156. As discussed in FIG. 3, the pre-emphasis procedure augments or increases the amplitude of higher frequency components, thus reducing their vulnerability to contamination by noise and interference. A limiter 164 clips or insures that the information modulated by transceiver 172 does not exceed the bandwidth specifications of wireless transceiver 140.

Figure 6:
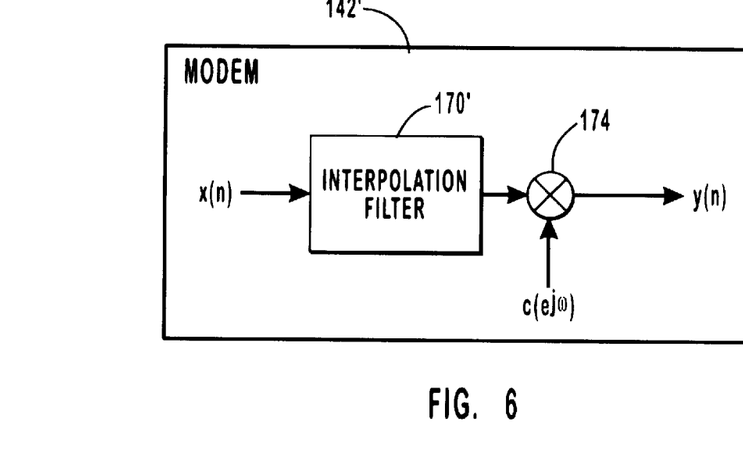
FIG. 6 is a block diagram of a modem adapted for pre-conditioning input data for transmission via a wireless transceiver adapted for transmission of voice information, in accordance with another embodiment of the present invention.

FIG. 6 is a block diagram of a modem 142', in accordance with an alternative embodiment of the present invention. In the present embodiment, pre-conditioning module 170' is implemented by a generally existing interpolation filter already present within modem 142'. Certain transmission specifications such as, V.34, incorporate pre-conditioning functions of the input data signal. Before baseband signal is modulated, and interpolation filter increases the sample rate by adding additional sample points to the signal. After inserting the additional points, such an interpolation filter may employ an FIR filter that typically performs a SIN[x(n)]/x(n) transfer function. If the transfer function was the convolution of the original FIR filter function with the Inverse Fourier transform of the inverse of the transmitter pre-emphasis waveform, the modulated signal would exhibit the desired spectral shape. Thus, an interpolation filter may be implemented with a digital signal processor which additionally may serve to perform the pre-conditioning procedure on the input data. Such a modification of the interpolation filter furthers the goal of the present invention by utilizing when available, existing structural components capable of carrying out the pre-conditioning process on baseband data prior to modulation by a modulator 174.

Figure 7:
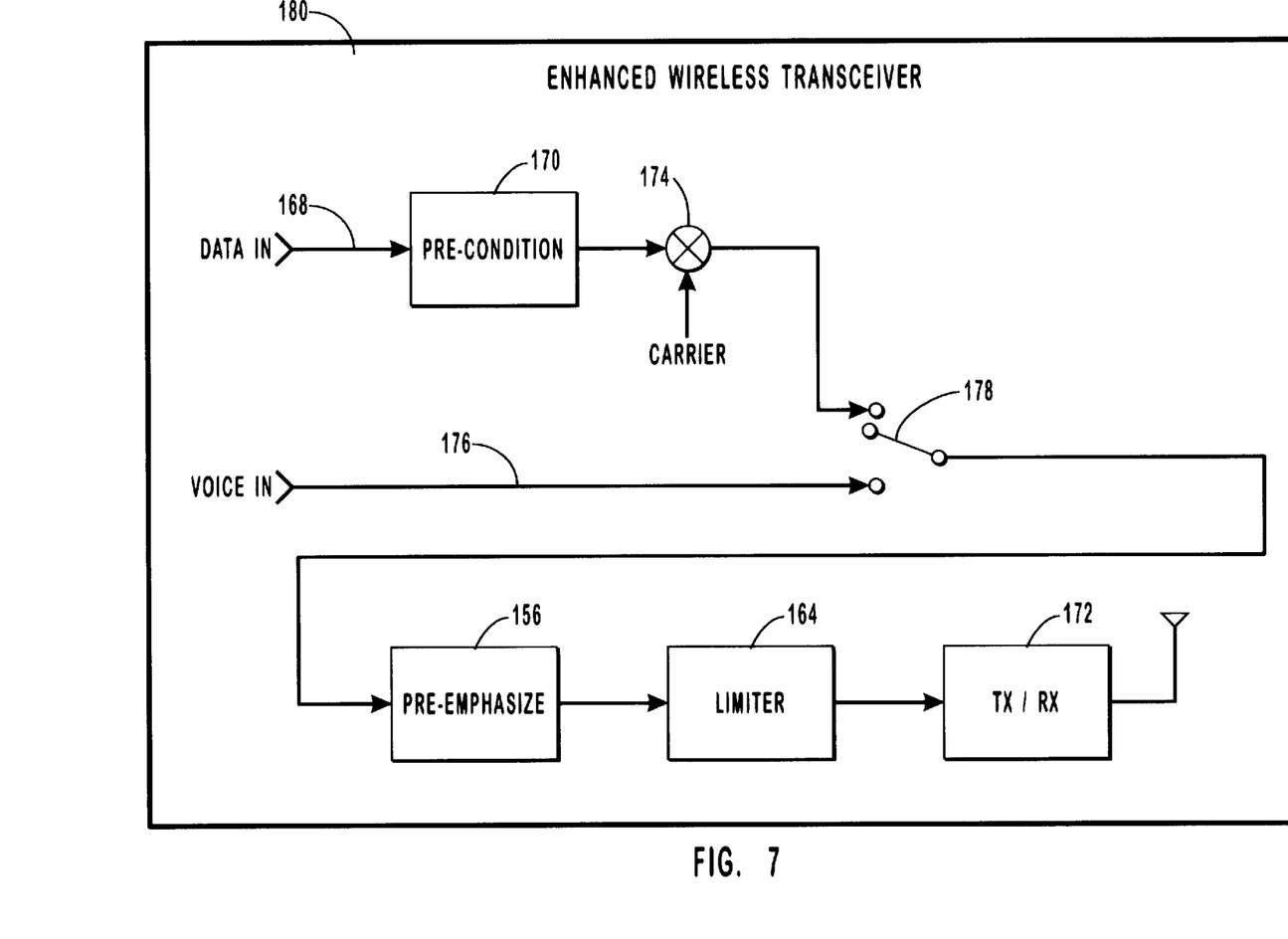
FIG. 7 is a block diagram of an enhanced wireless transceiver incorporating pre-conditioning of digital data and modulation of the pre-conditioned data directly within the wireless transceiver, in accordance with an alternate embodiment of the present invention.

FIG. 7 is a block diagram of an enhanced wireless transceiver incorporating the pre-conditioning feature therein, in accordance with another embodiment of the present invention. A pre-conditioning module 170 performs a de-emphasis process on input data 168 prior to delivering such pre-conditioned input data to modulator 174 for modulation with a carrier. A switch 178 detects the presence of input data and routes such modulated data, as opposed to voice information 176, to pre-emphasis module 156, limiter 164, and transceiver 172 whose processes are described in FIG. 4. Enhanced wireless transceiver 180, in essence, integrates modem 142 and wireless transceiver 140 (FIG. 5) into an integrated module capable of performing signal conditioning on input data 168.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a wireless communication system, a method for improving the data transmission rate of a data signal communicated on a wireless channel via a wireless transceiver having audio processing functions adapted for communication of an audio voice signal, said method comprising the steps of:

a. receiving an unmodulated baseband data signal;

b. altering amplitudes of selected frequency components of said baseband data signal to form a pre-conditioned baseband data signal having a predetermined spectral profile, wherein the spectral profile is substantially similar in shape to the spectral profile of an audio voice signal;

c. modulating said pre-conditioned baseband data signal to form a modulated pre-conditioned baseband data signal;

d. pre-emphasizing the modulated pre-conditioned baseband data signal at the wireless transceiver to form a transmission data signal for transmission on the wireless channel, the transmission data signal having a substantially flat spectral profile; and    e. presenting said modulated pre-conditioned baseband data signal to a modulated data input of said wireless transceiver for transmission on the wireless channel.

2. The method for improving the data transmission rate of a data signal on a wireless channel as recited in claim 1, wherein said modulating said pre-conditioned baseband data step comprises the step of modulating said pre-conditioned baseband data signal with a single carrier frequency.

3. The method for improving the data transmission rate of a data signal on a wireless channel as recited in claim 1, wherein said modulating said pre-conditioned baseband data step comprises the step of modulating said pre-conditioned baseband data signal with multiple carrier frequencies.

4. The method for improving the data transmission rate of a data signal on a wireless channel as recited in claim 1, wherein said modulating said pre-conditioned baseband data step comprises the step of modulating said pre-conditioned baseband data signal using a non-carrier type encoding technique.

5. The method for improving the data transmission rate of a data signal on a wireless channel as recited in claim 1, further comprising the steps of:
  a. interpolating said baseband data signal to up-sample said baseband data signal using a digital signal processor; and
  b. employing said digital signal processor to perform said altering amplitudes step.

6. In a wireless transceiver having audio processing functions adapted for transceiving voice information, a method for improving a data transmission rate of baseband data, said method comprising the steps of:
  (a) receiving said baseband data at said wireless transceiver;
  (b) selectively altering amplitudes of frequencies of said baseband data to complement said audio processing functions of said wireless transceiver to form pre-conditioned baseband data;
  (c) modulating said pre-conditioned baseband data to form modulated pre-conditioned baseband data;
  (d) selectively altering amplitudes of said modulated pre-conditioned baseband data to form pre-emphasized modulated pre-conditioned baseband data having essentially flat frequency amplitudes across said pre-emphasized modulated pre-conditioned baseband data; and
  (e) transceiving said pre-emphasized modulated pre-conditioned baseband data.

7. The method for improving a data transmission rate of baseband data as recited in claim 6, wherein said step of selectively altering amplitudes of frequencies of said baseband data comprises the step of spectral shaping said baseband data.

8. The method for improving a data transmission rate of baseband data as recited in claim 6, wherein said modulating said pre-conditioned baseband data step comprises the step of modulating said pre-conditioned baseband data with a single carrier frequency.

9. The method for improving a data transmission rate of baseband data as recited in claim 6, wherein said modulating said pre-conditioned baseband data step comprises the step of modulating said pre-conditioned baseband data with multiple carrier frequencies.

10. The method for improving a data transmission rate of baseband data as recited in claim 6, wherein said modulating said pre-conditioned baseband data step comprises the step of modulating said pre-conditioned baseband data using a non-carrier type encoding technique.

11. The method for improving a data transmission rate of baseband data as recited in claim 6, further comprises the steps of:
  (a) interpolating said baseband data to up-sample said baseband data using a digital signal processor within said wireless transceiver; and
  (b) employing said digital signal processor to perform said selectively altering amplitudes step.

12. The method for improving a data transmission rate of baseband data as recited in claim 6, further comprising the step of limiting an amplitude of said pre-emphasized modulated pre-conditioned baseband data to a maximum threshold required by an assigned bandwidth of said wireless transceiver.

13. A system for improving a data transmission rate of baseband data in a wireless communication system, comprising:
  a. a wireless transceiver with audio processing functions adapted for voice, the wireless transceiver being capable of generating an RF signal comprised of conditioned baseband data and further including a limiter to prevent said RF signal from exceeding an allowed bandwidth in said wireless communication system; and
  b. a wireless transceiver modem for receiving baseband data, said wireless transceiver modem including:
    a pre-conditioner module which selectively alters amplitudes of said baseband data below levels affected by said limiter to form pre-conditioned baseband data;
    a modulator operably coupled to said pre-conditioner module for combining said pre-conditioned baseband data with a carrier signal to form modulated pre-conditioned baseband data for delivery to a modulated data input on the wireless transceiver.

* * * * *

UNITED STATES PATENT AND TRADEMARK OFFICE
CERTIFICATE OF CORRECTION

PATENT NO. : 6,130,916
DATED : October 10, 2000
INVENTOR(S) : Larry Steve Thomson It is certified that error appears in the above-identified patent and that said Letters Patent is hereby corrected as shown below:

Column 3,
Line 64, after "data," insert -- and --

Column 6,
Line 56, after "frequencies" change "which continues" to -- and continues --

Column 7,
Line 35, after "152" change "were" to -- was --

Column 9,
Line 8, after "data to" change "crate" to -- create --
Line 13, after "156" change "on generating" to -- which generates --
Line 15, after "invention, the" change "pre-conditioned" to -- pre-conditioning --
Line 32, before "count" change "components" to -- component --
Line 60, after "modulated," change "and" to -- an --

Signed and Sealed this

Fourth Day of December, 2001

*Attest:*

*Attesting Officer*

NICHOLAS P. GODICI
*Acting Director of the United States Patent and Trademark Office*